US009380073B2

(12) United States Patent
Zent et al.

(10) Patent No.: US 9,380,073 B2
(45) Date of Patent: Jun. 28, 2016

(54) REPUTATION SYSTEM IN A DEFAULT NETWORK

(71) Applicant: Foxwordy, Inc., San Carlos, CA (US)

(72) Inventors: Monica Zent, Sunnyvale, CA (US); Robert Schmitt, Santa Barbara, CA (US)

(73) Assignee: FOXWORDY INC., San Carlos, CA (US)

( * ) Notice: Subject to any disclaimer, the term of this patent is extended or adjusted under 35 U.S.C. 154(b) by 96 days.

(21) Appl. No.: 14/188,578

(22) Filed: Feb. 24, 2014

(65) Prior Publication Data

US 2015/0101008 A1    Apr. 9, 2015

Related U.S. Application Data

(60) Provisional application No. 61/889,009, filed on Oct. 9, 2013.

(51) Int. Cl.
*H04L 29/06* (2006.01)
*H04L 29/08* (2006.01)
*G06F 17/30* (2006.01)

(52) U.S. Cl.
CPC ............ *H04L 63/20* (2013.01); *G06F 17/3053* (2013.01); *G06F 17/30702* (2013.01); *G06F 17/30867* (2013.01); *H04L 63/126* (2013.01); *H04L 67/306* (2013.01)

(58) Field of Classification Search
CPC ....... H04L 63/08; H04L 63/20; H04L 63/104; H04L 63/0407; H04L 67/306; H04L 63/126; G06F 17/30867; G06F 17/30702; G06F 17/3053
USPC ...................... 726/1–4, 7; 709/229, 203–205, 709/224–225; 705/318, 319; 713/168
See application file for complete search history.

(56) References Cited

U.S. PATENT DOCUMENTS

| | | | |
|---|---|---|---|
| 8,782,217 B1* | 7/2014 | Arone et al. | 709/224 |
| 8,793,255 B1* | 7/2014 | Bilinski | G06F 17/30867 707/740 |
| 8,812,690 B1* | 8/2014 | Ramesh et al. | 709/227 |
| 2006/0042483 A1* | 3/2006 | Work | G06Q 10/00 101/91 |
| 2008/0109491 A1* | 5/2008 | Gupta | G06Q 10/10 |
| 2012/0296965 A1* | 11/2012 | Srivastava | 709/204 |
| 2013/0124644 A1* | 5/2013 | Hunt | H04L 51/12 709/206 |
| 2013/0346497 A1* | 12/2013 | Hofmayer et al. | 709/204 |
| 2014/0095492 A1* | 4/2014 | Bhardwaj | H04L 63/102 707/725 |
| 2014/0196110 A1* | 7/2014 | Rubinstein | H04L 63/08 726/3 |

OTHER PUBLICATIONS

Wei Chen et al, Social Network Collaborative Filtering Framework and Online Trust Factors: a Case Study on Facebook, pp. 266-273, IEEE, 2010.*

* cited by examiner

*Primary Examiner* — Shanto M Abedin
(74) *Attorney, Agent, or Firm* — Fenwick & West LLP

(57) ABSTRACT

A system and a method are disclosed for computing a reputation score for user profiles of a social network according to actions taken by user profiles of the social network. The reputation score may be based on interactions of a user profile with a content item or based on interactions of user profiles with other user profiles. Actions may be weighted differently in calculating a reputation score as a sum of products of action counts and actions weights. Reputation scores calculated may be used to rank user profiles and to determine reputation levels for user profiles based on exceeding a threshold in reputation score or reputation ranking.

20 Claims, 6 Drawing Sheets

| 400 | | | | | | | |
|---|---|---|---|---|---|---|---|
| User ID 402 | Time Created 404 | Time Updated 406 | Item Views 408 | Item Uploads 410 | Item Interactions 412 | Views Received 414 | Interactions Received 416 | Connections 418 |

| Connection Reputations 420 | Overall Score 422 | Overall Rank 424 | Overall Level 426 | Category Score 428 | Category Rank 430 | Category Level 432 |
|---|---|---|---|---|---|---|

FIG. 4

| 500 | | | | | | |
|---|---|---|---|---|---|---|
| Item Views Weight 502 | Item Uploads Weight 504 | Item Interactions Weight 506 | Views Received Weight 508 | Interactions Received Weight 510 | Connections Weight 512 | Connection Reputations Weight 514 |

REPUTATION SYSTEM IN A DEFAULT NETWORK

CROSS REFERENCE TO RELATED APPLICATIONS

This application claims the benefit of U.S. Provisional Application No. 61/889,009, filed Oct. 9, 2013, which is incorporated by reference in its entirety.

BACKGROUND

1. Field of Art

The disclosure generally relates to the field of social networking, and more particularly, to quantifying user reputation in a social network computing system.

2. Description of the Related Art

Professionals in a work environment may judge the quality of each other's work and advice based on prior experiences with a colleague giving advice as well as knowledge about the colleague's expertise. In interactions with an unmet interlocutor through a website or a social network, professionals have little information to judge the quality of advice, opinions, or work received. Additionally, many website and social networks allow the use of full anonymity through pseudonyms that may entirely obscure an interlocutor's identity. Interlocutors may claim an identity of an entirely different person due to difficulty of user identity verification and lack of resources for policing. Although some have previously attempted to quantify user reliability, such attempts use a single factor. For example, online forums use number of user posts as a proxy for user experience and reliability.

BRIEF DESCRIPTION OF DRAWINGS

The disclosed embodiments have other advantages and features, which will be more readily apparent from the detailed description, the appended claims, and the accompanying figures (or drawings). A brief introduction of the figures is below.

FIG. 4 illustrates an entry in a reputation count store in one embodiment.

FIG. 5 illustrates an entry in a reputation weights store in one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system (and method and computer readable storage medium) includes quantifying reputation of user profiles within a default network computing system. A default network computing system contains computer systems configured as client computer systems (or client devices or clients) and server computer systems (or server devices or servers) connected by a network. Users of the default network computing system may upload data including personal information and content to a server and may view data uploaded by other users. The default network server contains storage modules to organize uploaded data for manipulation and retrieval as well as engines to process and retrieve data in a form useful to the user. Users create user profiles, which are organized into one or more default networks, which contain user profiles sharing one or more attributes. User profiles may also create connections with other user profiles.

When user profiles interact with or upload content to the default network computing system, a record of the interaction is made. A count of actions made through a user profile is used to calculate a reputation score. The weighting of each action count may be varied, so the reputation score calculated for a user profile better reflects the user profiles perception by users of the default network computing system. Based on the calculated reputation score, user profiles are ranked, and reputation levels for user profiles are determined based on the user rankings. Reputations scores, rankings, and reputation levels may be displayed as part of user profiles or in connection with interactions of a user profile in the default network computing system.

Computing Machine Architecture

Figure 1:
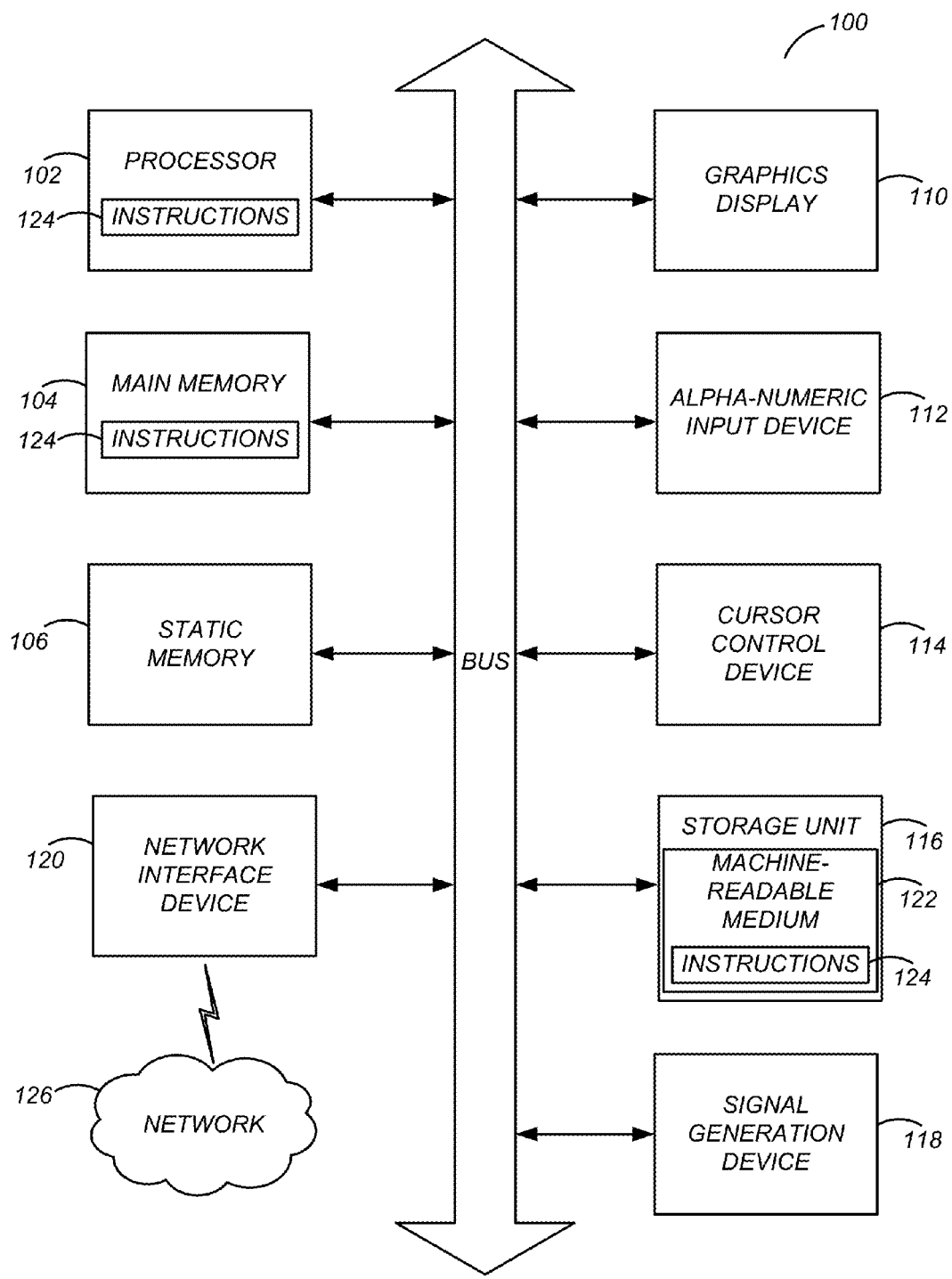
FIG. 1 illustrates one embodiment of components of an example machine able to read instructions from a machine-readable medium and execute them in a processor (or controller).

Turning first to FIG. (FIG. 1, it is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine (or device) or a client machine (or device) in a server-client network environment, or as a peer machine in a peer-to-peer (or distributed) network environment.

The machine may be a server device or computer or a client device or computer that can be structured as a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 (e.g., WiFi, 3G, 4G, Ethernet, digital subscriber line (DSL), fiber optic network) via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Example Architectural Configuration

Figure 2:
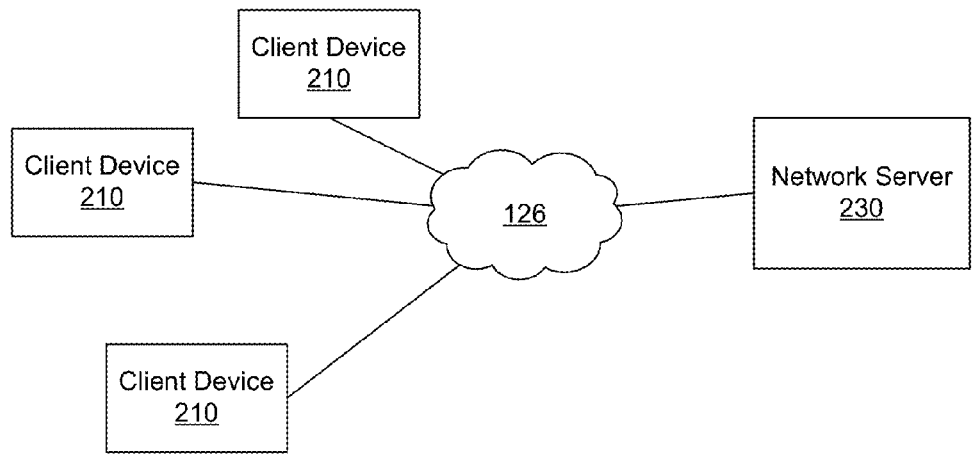
FIG. 2 illustrates an architectural configuration used to implement one example embodiment of the default network computing system.

Referring now to FIG. 2, illustrated is a block diagram of a default network environment 200 in an example embodiment. The default network environment 200 includes one or more client device 210 (e.g., a personal computer, a tablet, a smartphone, a cellular phone, a terminal, a smart television, a personal digital assistant (PDA), a smart watch, a wearable computer), a network 126, and a network server 230. A computer system 100 may be used in some embodiments of the client device 210 and/or network server 230. The one or more client devices 210 are coupled to the network 126, which is in turn coupled to the network server 230. In an alternate embodiment, additional networks 126, client devices 210, and/or network servers 230 may be present. For example, an additional network server 230 may act as a proxy server between the one or more client devices 210 and another network server 230.

The one or more client devices 210 may be used by users to view, upload, submit, and interact with content in the default network. For example, a user may provide a numerical rating of content uploaded by another user. Users of the one or more client devices 210 may create user profiles and may connect their user profiles on the default network to other user profiles on the default network. Users of the one or more client devices 210 may declare or modify preferences governing their user profile and/or content they upload. For example, a user may limit who may view content that the user has uploaded. In an example embodiment, HyperText Markup Language (HTML) code is used to display content on the client device 210. Alternate embodiments may use other data-interchange formats such as Extensible Markup Language (XML) or JavaScript Object Notation (JSON). A client device 210 may be associated with a single user profile, or the client device 210 may be associated with multiple user profiles. In an embodiment, a user may access their user profile through multiple client devices 210.

In one embodiment, the network server 230 stores data about the default network including user profiles, content, and connections between users. The network server 230 may retrieve and/or process data as requested by users of client devices 210. In an embodiment, HyperText Transfer Protocol (HTTP) may be used to exchange or transfer data between a network server 230 and a client device 210 using HTTP methods including GET, POST, PUT, and DELETE. In an alternate embodiment, some or all of the processing and/or storing functions of the network server 230 may be performed by one or more client devices 210 alone or in combination with a network server 230. In an alternate embodiment, a single device may implement components of a client device 210 and a network server 230.

Figure 3:
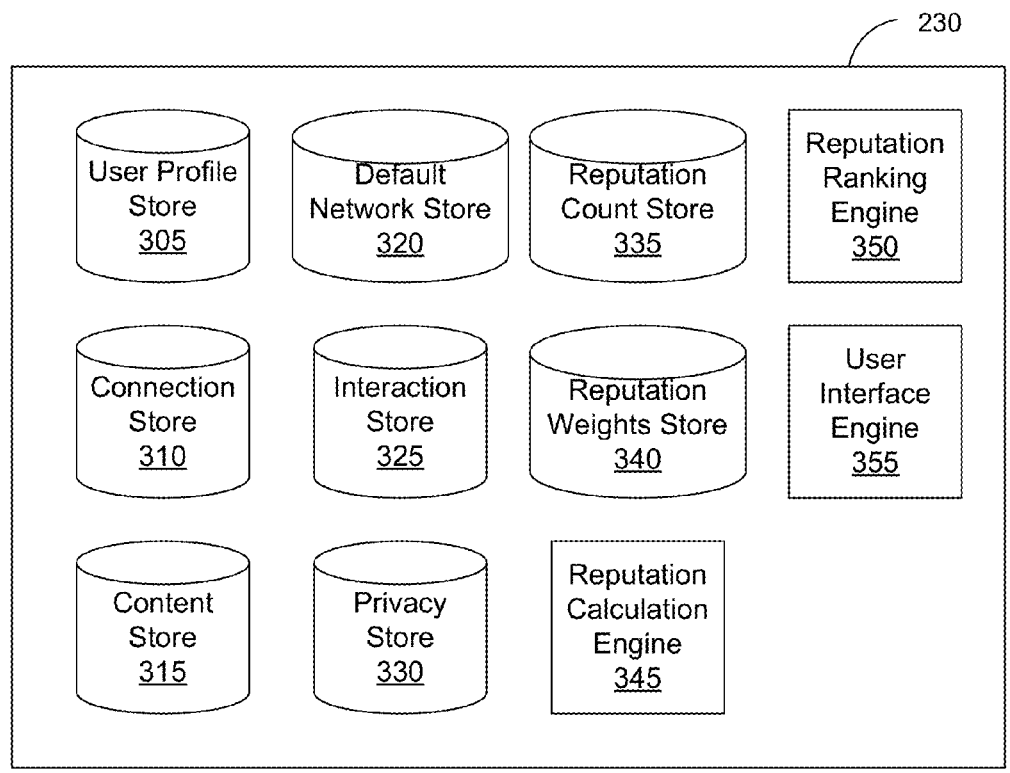
FIG. 3 illustrates a block diagram of a network server used to implement interaction privacy in the default network computing system in one embodiment.

Referring now to FIG. 3, illustrated is a block diagram of a network server 230 used to implement the default network in one embodiment. The network server 230 contains a user profile store 305, a connection store 310, a content store 315, a default network store 320, an interaction store 325, a privacy store 330, a reputation count store 335, a reputation weights store 340, a reputation calculation engine 345, a reputation ranking engine 350, and a user interface engine 355. The user profile store 305 contains information that a user has provided (e.g., a user profile created by a user). Example information in a user profile entry of the user profile store 305 may include a unique user identification (ID), first name, last name, location, company, title, account type, expertise, and practice area. Other information in a user profile may include previous work history, education, honors, awards, associations, languages, certifications, contact details, a profile image uploaded by the user, and a written biographical summary or statement of purpose submitted by the user.

The connection store 310 stores one or more connections made between users using their user profiles. In an embodiment, connections are stored as connection entries between a user profile and another user profile. User profiles that are connected may be granted additional access to each other's user profiles or content that has been uploaded. Connections may be used to create an individualized activity feed for a user that summarizes recent actions taken by connections and other relevant users. An example activity feed may include recently uploaded excerpted content items, recent comments on excerpted content items, requests, referrals, or questions. Connections may be additionally be used to suggest new connections (e.g., based on connections in common). User profiles that are connected to a particular user profile may have additional opportunities for interaction with the particular user profile such as suggesting new connections, sending messages, requests, referrals, content items, or questions, for example. A user profile connected with a particular user profile may have additional access to the particular user's excerpted content and/or user profile page.

The content store 315 stores excerpted content items uploaded by users of the default network computing system. In one embodiment, excerpted content is stored as text or as a text file, but other embodiments may contain content including images, videos, and/or audio files. Excerpted content items in the content store 315 may be accessed through a search interface or other links in the user interface. Excerpted content items may be displayed by the user interface engine 350. In an embodiment, excerpted content items may be uploaded as "Clauses," defined herein as text entered into the default network user interface, and "Documents," defined herein as files uploaded through the default network user interface. Example information stored in a content store entry may include content text, content title, a user identification (ID) of a user profile that created the content item, time created, time stored, time updated, time published, content state, content identification (ID), a content key generated by hashing the content text, content metadata, and content file size. The excerpted content store 315 may be accessed by the user interface engine 350.

The default network store 320 stores data relating to a default network. A user profile is associated with a default network based on one or more attributes a user profile shares with other user profiles in the default network. An example entry in the default network store 320 may include a unique identifier for the default network, user profiles associated with the default network, and common attributes of those user profiles associated with the default network. In an alternate embodiment, a user profile may be placed in one or more default networks according to one or more attributes chosen by a user who created the user profile. Attributes of a user profile may include practice area, location, expertise, occupation, industry, sub-industry, employer, and account type. For example, a user profile may be placed in the same default network as other users having the same account type, location, and practice area. The default network may be used to suggest additional connections for a user profile (i.e., other user profiles in the user's default network). Membership in a default network may grant access to user profiles of member users in the default network or excerpted content items or interactions uploaded by member users in the default network. In an embodiment, the default network may be used to generate an activity feed listing excerpted content uploaded to other user profiles, interactions with excerpted content, and between user profiles.

The interaction store 325 records interactions between user profiles. For example, the interaction store may 325 record when a user chooses to follow another user's user profile, to state interest in another user's user profile, to state another user profile as a favorite, to share excerpted content with a user profile, to comment on excerpted content, to rate excerpted content, up vote or like excerpted content, to make or fulfill a request, to ask or answer a question, to request or make a referral, to search for content, to search for a user profile, or to view content. Entries in the interaction store 325 may include fields identifying the interaction type, an interaction identification (ID), a user ID of the user profile that initiated the interaction, a user ID of a user profile at which an interaction is directed, a time the interaction occurred, a time the interaction was updated, an interaction ID corresponding to another interaction responsive to the interaction, a message included in the interaction, and other fields relevant to the particular interaction. The interaction store 325 may be accessed by the user interface engine 350 to generate user interaction histories or to suggest connections or excerpted content to a user profile. The interaction store 325 may be used by the reputation count store 335 to tally actions associated with a user.

The privacy store 330 stores user preferences regarding privacy of user profile information, user interactions, and/or content items uploaded by a user. Privacy preferences stored may control access to a user profile, user interaction, or excerpted content item by granting access to user profiles that have sufficient permission to the requested information. Other privacy preferences control how a user profile appears to other user profiles. For example, a user can choose full anonymity, no anonymity, or partial anonymity (e.g., no name displayed, but job title and practice area displayed). Privacy settings may make a user profile, user interaction, or excerpted content item fully public, fully private, or available to certain user profiles (e.g., user profiles with which a user profile is connected, user profiles in the same default network). Settings in the privacy store 330 may be checked by the reputation ranking engine 350 or user interface engine 355. The privacy store 330 may be updated when a user uploads excerpted content, creates an interaction, or modifies privacy settings generated by the user interface engine 355.

The reputation count store 335 stores counts of user actions that may be included in a user reputation score. Actions by a user profile may affect the user's reputation score, as can actions by other user profiles that interact with content created by a user (e.g., excerpted content items or interactions). Actions by a user profile relevant to a reputation score include viewing content items on the default network, interacting with content on the default network, and uploading content to the default network. Actions by other user profiles relevant to a user profile's reputation score include views and interactions with content items created by the user. Additionally, connections of a user profile may affect the user profile's reputation score. For example, the reputation count store may tally views of an excerpted content item uploaded by a user. The reputation count store 335 may also include a calculated score of user reputation points as well as calculated subtotals of user reputation points in particular categories. For example, a popularity subtotal may be calculated and stored based on actions including views by other users of an excerpted content item uploaded by a user. In one embodiment, reputation rankings and levels, both for overall reputation and reputation subtotals, are stored in the reputation count store 335. The reputation count store 335 may be accessed and/or modified by the reputation calculation engine 345, the reputation ranking engine 350, or the user interface engine 355.

The reputation weights store 340 stores weights used to calculate a reputation score. The weights in the reputation store may correspond to the actions tracked by the reputation count store 335. For example, the reputation weights store 340 may include a weight corresponding to views of excerpted content uploaded by a user for use in calculating a reputation score and/or calculating a popularity subtotal. In an alternate embodiment, the reputation weights store may further include weights assigned to subtotals of actions that may modify their weighting in calculating a reputation score. The reputation weights store 340 may be accessed by the reputation calculation engine 345. In an embodiment, the weights in the reputation weights store 340 are set by default network administrators.

The reputation calculation engine 345, which may be configured with elements similar to computer system 100, determines a reputation score for one or more user profiles of the default network computing system based on actions relating to the one or more user profiles as well as the connections of the user profiles. The reputation calculation engine 345 uses the counts in the reputation count store 335 and the weights in the reputation weights store 340 to calculate a reputation score or reputation subtotals for categories of actions. In one embodiment, the count of a plurality of actions is multiplied by a plurality of weights corresponding to the actions. The resulting products are summed to calculate the reputation score. In one embodiment, actions are classified into categories of actions with corresponding reputation subtotals. Example categories may include effort, popularity, quality, and influence. The reputation score or a subtotal for a reputation category may be displayed as part of a user's profile page or in connection with content items uploaded by a user. The reputation calculation may be performed periodically as part of an automatic routine or may be performed in response to a request from a user, the reputation ranking engine 350, or the user interface engine 355.

The reputation ranking engine 350, which may be configured with elements similar to computer system 100, creates rankings of user profiles based on reputation and assigns user profiles reputation levels based on reputation rankings. The reputation ranking engine 350 uses reputation scores as calculated by the reputation calculation engine 345 or as stored in the reputation count store 335. The reputation engine 350 ranks user profiles based on their retrieved reputation totals. In an embodiment, the reputation engine ranks user profiles based on subtotals calculated. Based on the ranking by total reputation or reputation within a category, the reputation engine 350 determines reputation levels for user profiles. Example reputation levels may be based on percentiles such as top-twenty percent, top-ten percent, and top-five percent. Reputation rankings and/or levels may be displayed as part of a user profile or in association with an interaction or a content item uploaded by a user. The reputation ranking and level determination may be performed periodically as part of an automatic routine or may be performed in response to a request from the user or the user interface engine 355.

The user interface engine 355, which may be configured with elements similar to the computer system 100, creates interfaces to provide for display on a client device 210. Example interfaces may be structured to display a user profile, connections of a user profile, pending connections, potential connections, connections in a default network, excerpted content submitted by a user profile, interactions between one user profile and another user profile, and/or aggregations of user interactions. Example interfaces may be structured to display data passively and/or accept input from the user of a client device 210. The user interface engine 355 may retrieve, store, and/or modify data from the user profile store 305, the connection store 310, the content store 315, the default network store 320, the interaction store 325, the privacy store 330, and/or the reputation count store 335. The user interface engine 355 may provide inputs to or receive outputs from the reputation calculation engine 345 or reputation ranking engine 350.

The network server 230 may contain additional modules, engines, or stores. For example, the network server may include a file store to store the original files for uploaded Documents. The network server may include a connection invitations store to track pending connection invitations. As another example, the network server 230 may contain a content misuse table, which records content flagged as inappropriate or confidential. In an embodiment, the network server may contain additional tables to categorize excerpted content items, such as attributes associated with an excerpted content item. The network server 230 may contain additional engines for handling connection requests, for uploading excerpted content to the content store 315, for creating and modifying default networks in the default network store 320, or controlling access to data based on user privacy or anonymity preferences.

User and Connection Data

Referring to FIG. 4, illustrated is an entry for tracking user actions used for calculation of a reputation score. In one embodiment, data stores (e.g., 305, 310, 315, 320, 325, 330, 335, 340) are implemented in a Relational Database Management System (RDBMS) implemented in a programming language such as Structured Query Language (SQL), PostgreSQL, MySQL, SQL Server, or Oracle. An example reputation count entry 400 implements the reputation count store 335 and contains a user ID field 402, a time created field 404, a time updated field 406, an item views field 408, an item uploads field 410, an item interactions field 412, a views received field 414, an interactions received field 416, a connections field 418, a connection reputations field 420, an overall score field 422, an overall rank field 424, an overall level field 426, a category score field 428, a category rank field 430, and a category level field 432. The user ID field 402 specifies the user profile that the reputation count entry 400 tracks for calculation of a reputation score. The user ID field 402 matches the user ID in the specified user profile's entry in the user profile store 305. The time created field 404 indicates the time at which the reputation count entry 400 was created. The time updated field 406 indicates the time at which the reputation count entry 400 was last updated.

The item views field 408 counts how many times the specified user profile has viewed content items on the default network computing system. Example items may include excerpted content items, user profiles, questions, discussions, topics, forum posts, resources, requests, referrals, answers, messages, comments, office swaps, and search results. Views may include instances a user profile has requested an item for display as well as instances of downloading, saving, or copying an item. The item uploads field 410 counts how many times the specified user profile has uploaded items such as those listed previously on the default network computing system. In an alternate embodiment, modifications to an uploaded item may be counted by the item uploads field 410. The item interactions field 412 counts how many times the specified user profile has interacted with items uploaded by user profiles of the default networking computing system. Example interactions may include marking as a favorite, following, sharing, responding to, commenting on, liking, downloading, saving, up voting, or copying an item. Messaging a user profile or inviting a user profile to connect or join a group may also be included in interactions. The views received field 414 counts how many other user profiles have viewed an item uploaded by or associated with the specified user profile. Views may include instances a user profile has seen an item displayed as well as instances of downloading, saving, or copying an item. The interactions received field 416 counts how many other user profiles have interacted with a user profile or with an item uploaded by or associated with the specified user profile. The connections field 418 includes a count of user profiles connected with the specified user profile. The connection reputations field 420 is a measure of reputation of user profiles connected with the specified user profile. In example embodiments, the connection reputations field 420 may be a sum of reputations, an arithmetic mean or geometric mean of reputations, or some other aggregation of reputation scores. In an alternate embodiment, the connection reputations field 420 may use one or more categories in place of, or in addition to, calculating a reputation score. The overall score field 422 indicates a reputation score calculated by the reputation calculation engine 345 for the specified user profile. The overall rank field 424 indicates a rank determined by the reputation ranking engine 350 for the specified user profile. The rank may, in example embodiments, be an ordinal rank out of all user profiles, user profiles in the same default network as the specified user profile, user profile that are connected to the specified user profile, user profiles having a common employer with the specified user profile, or user profiles having the same account type as the specified user profile. In an alternate embodiment, the rank may be a percentile rank. The overall level field 426 indicates a reputation level for a user profile based on the determined rank. Reputation levels may correspond to percentiles of ranking, thresholds of points, or some combination. The category score field 428 indicates a reputation score for a category calculated by the reputation calculation engine 345 for the specified user profile. Categories of reputation may be calculated from some of counted actions. The category rank field 430 indicates a rank determined by the reputation ranking engine 350 for the specified user profile in a category. The category level field 432 indicates a reputation level for a user profile in a category based on the determined rank in the category.

In an embodiment, a reputation count entry 400 may have additional entries or more specific entries. For example, there may be a category score, rank, and level field 432 for a plurality of categories such as effort, popularity, quality, and influence. There may be a plurality of fields for actions included in a count. For example, the item views field 408 may be supplemented or replaced by fields counting excerpted content items, questions, referrals, messages, user profiles, discussions, and requests viewed. Additional fields may include counts of followers of the specified user profile, inclusions in user-created groups, events hosted, or the number of content items a user profile has created that have achieved a critical mass (i.e., interactions with the post have exceeded a given threshold). In an alternate embodiment, fields may attempt to quantify the specified user profile's experience based on information entered in the specified user's user profile including work history, education, and professional certifications.

Referring to FIG. 5, illustrated is an entry for storing weights used in calculation of a reputation score. An example reputation weights entry 500 implements the reputation weights store 340 and contains an item views weight field 502, an item uploads weight field 504, an item interactions weight field 506, a views received weight 508, an interactions received weight 510, a connections weight 512, and a connection reputations weight 514. The weights stored in the reputation weights entry 500 are used by the reputation calculation engine 345 to calculate a reputation score and subtotals for categories of reputation. The item views weight 502 specifies the weighting of the count in the item views field 408 in the reputation calculation. In an embodiment, the weight stored in the item views weight field may be an integer, fraction, or decimal number. Similarly, the fields 504, 506, 508, 510, 512, and 514 specify the weighting of the count in the fields 410, 412, 414, 416, 418, and 420 respectively. In an alternate embodiment, the weight fields may be supplemented or replaced by fields specifying weights for more specific actions. For example the item views weight field 502 may be supplemented or replaced by fields specifying weights for counts of views of excerpted content items, questions, referrals, messages, user profiles, discussions, and requests.

Calculating Reputation Scores

Figure 6:
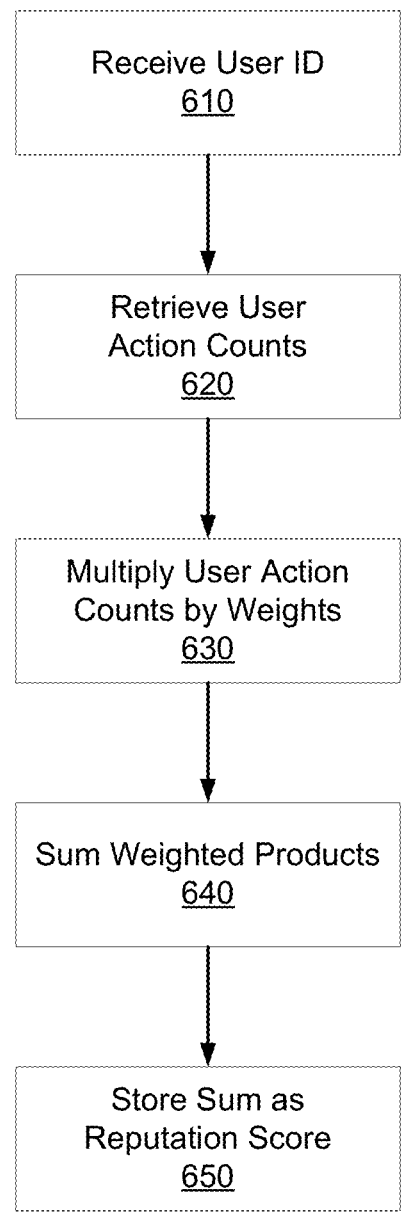
FIG. 6 illustrates a flow chart of an example process for calculating a reputation score of a user of the default network computing system.

Referring now to FIG. 6, illustrated is a flow chart of an example process for calculating a reputation score of a user profile of the default network computing system. A user ID is received 610, user action counts are retrieved 620, the user action counts are multiplied 630 by weights, the resulting weighted products are summed 640, and the sum is stored 650 as a reputation score. In an embodiment, the reputation score calculation 600 is performed by the reputation calculation engine 345. A user ID is received 610 from the user interface engine 355 or from a process that periodically updates user reputation scores. In an alternate embodiment, a request for a user reputation score may be received 610 from an Application Programming Interface (API).

A plurality of user action counts are retrieved 620 from the reputation count store 335. Example user action counts may include the fields 408, 410, 412, 414, 416, 418, and 420 of the reputation count store. The plurality of user action counts are multiplied 630 by a plurality of weights retrieved from the reputation weights store 340. Example connection weights include those in the fields 502, 504, 506, 508, 510, 512, and 514. The weight by which an action count is multiplied corresponds to a particular action count, in one embodiment. In an alternate embodiment, a weight may be used for multiplying a plurality of action counts. The products resulting from multiplying the action counts by weights are summed 640. In an alternate embodiment, a balancing function such a logarithm or root may be applied to the products before they are summed 640 for encouraging broader user participation in all counted actions. The resulting sum is stored 650 as a reputation score in overall score field 422. In an alternate embodiment, the reputation score is not stored 650 but may be provided for display or otherwise used (e.g., through an API). The reputation score calculation 600 may be repeated using selected action counts to calculate one or more categories of reputation for storage in the category score field 428.

Determining Reputation Levels

Figure 7:
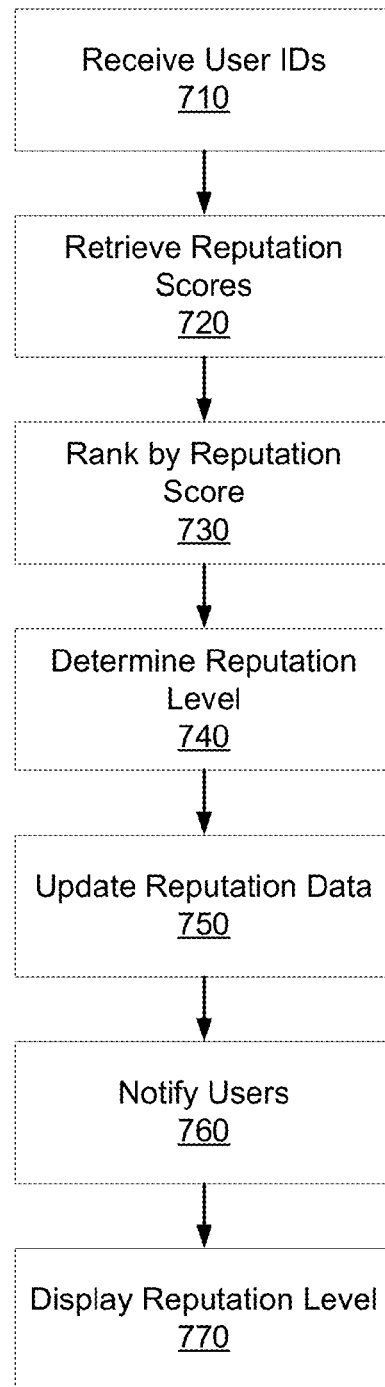
FIG. 7 illustrates a flow chart of an example process for determining a reputation level of a user of the default network computing system.

Referring now to FIG. 7, illustrated is a flow chart of an example process for determining a reputation level of a user profile of the default network computing system. A plurality of user IDs are received 710, reputation scores are retrieved 720, user profiles are ranked 730 by reputation score, reputation levels are determined 740, reputation data is updated 750, user profiles are notified 760, and the reputation levels are displayed 770. The reputation level determination 700 is performed by the reputation ranking engine 350, in one embodiment. The plurality of user IDs may be received from the user interface engine 355, a routine that periodically ranks user profiles, an API, or another module of the network server 230. The plurality of users IDs may comprise all the user profiles of the default network computing system, user profiles from a default network, user profiles connected with a particular user profile, user profiles within a user-created group, user profiles having a particular account type, user profiles having a particular location, or other groupings of user profiles.

Reputation scores corresponding to the received user IDs are retrieved 720 from the reputation count store 335. In an embodiment, the overall score field 422 is used. In another embodiment where user profiles are ranked by a category, the category score field 428 may be used. The user profiles specified by the received user IDs are ranked 730 by the retrieved reputation scores. Using the ranking of user profiles by reputation, reputation levels are determined 740 for the plurality of user profiles that were received 710. Reputation levels may be determined 740 based on exceeding a percentile threshold, the percentile calculated from the ranking of the received user profiles in one embodiment. In an alternate embodiment, reputation levels may be determined 740 based on exceeding one or more thresholds of reputation score. Reputation levels may correspond to overall scores or may correspond to a category of reputation. User profiles having a reputation ranking or score that falls below a threshold may not have a reputation level or may have a non-displaying reputation level.

Reputation data in the reputation count store 335 is updated 750 based on the determined ranks and determined reputation levels. For example, if the reputation scores retrieved measured overall reputation, then the rank is stored in the overall rank field 424 and the reputation level is stored in the overall level field 426. If the reputations scores retrieved correspond to categories of reputation, then the rank is stored in the category rank field 430 and the reputation level is stored in the category level field 432. User profiles are notified 760 of the results of the reputation level determination 700. User profiles may be notified 760 using means of communication including email, messages within the default network computing system, a push notification to smart phone, of a text message. In one embodiment, user profiles that have attained particular reputation levels are notified 760. In an alternate embodiment, user profiles are notified 760 of their ranking regardless of attaining a reputation level. The reputation level may be displayed 770 on user profiles corresponding to the user profiles that were received 710 or in interactions associated with those user profiles. In an embodiment, one or more of updating reputation data, notifying user profiles, or displaying reputation level may be omitted.

User Interface

Figure 8:
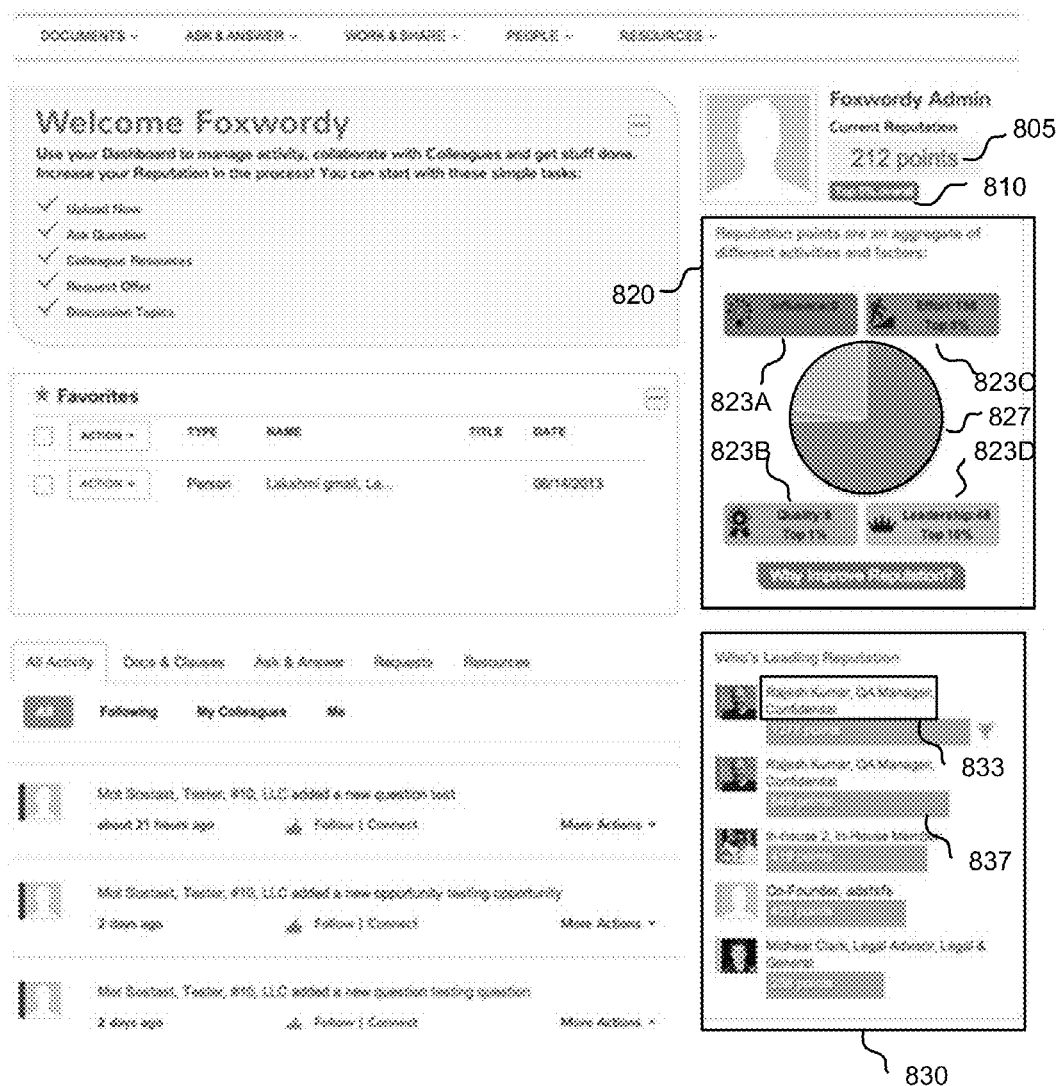
FIG. 8 illustrates an example user interface for viewing reputation scores, reputation levels, and reputation rankings in the default network computing system.

Referring to FIG. 8, illustrated is an example user interface for viewing reputation scores, reputation levels, and reputation rankings in the default network computing system. The user privacy reputation interface 800 contains a reputation score indicator 805, a reputation level indicator 810, a reputation category display 820, and a reputation ranking 830. The reputation category display 820 includes reputation categories 823 and a reputation category graphic 827. The example reputation categories included are an influence category 823A, a quality category 823B, an effort category 823C, and a leadership category 823D. The reputation ranking 830 contains a user identifier 833 and a reputation points display 837.

The reputation score indicator 805 indicates a displayed user profile's overall reputation score as stored in the overall score field 422 of the reputation score entry 400 corresponding to the displayed user profile. The reputation level indicator 810 indicates a user profile's reputation level based on overall reputation score as stored in the overall level field 426. In the given example, the user profile has ranked in the top five percent of ranked user profiles. In an alternate embodiment, reputation levels may be given different names (e.g., silver, gold, platinum).

The reputation category display 820 indicates how much actions within various categories have contributed to the total reputation score. The reputation categories 823 indicate reputation points within a category (as taken from the category score field 428) and ranking within a category (as taken from the category level field 432). The reputation category graphic 827 visually displays the relative points in each category of the reputation score. The colors of the reputation category graphic 827 match the colors of the corresponding categories among the reputation categories 823, and the areas are proportional to the percentage of the reputation score that comes from the corresponding categories.

The reputation ranking 830 lists the top user profiles from a reputation ranking. In the displayed embodiment, five user profiles having high rankings are displayed; however, in alternate embodiments, an arbitrary number of user profiles may be listed as part of the reputation ranking 830. The user profiles displayed in the reputation ranking have user identifiers 833. The data in the user identifier may be retrieved from the user profile store 305 and displayed subject to restrictions in the privacy store 330. For example, if a user profile's anonymity level is set to partial anonymity, the user profile's name and/or company may be hidden from the user identifiers 833. For example, if a user has specified that the user profile's reputation visibility is user only (i.e., only the user profile may see the user's reputation), then the reputation ranking 830 may not include the user profile. The reputation points display 837 indicates how many reputation points a ranked user profile has. In one embodiment, the reputation points display 837 contains a horizontal bar having an area is proportional to the reputation points of a user profile. In an alternate embodiment, the reputation ranking 830 may include an indication of the user profile's reputation level. In an alternate embodiment, user profiles may be ranked by reputation after filtering by an attribute selected by a user profile. For example, a viewing user may desire to view the user profiles with top reputations among user profiles in a particular practice area and/or location.

Additional Considerations

The disclosed embodiments beneficially allow for quantification of user reputation in the social networking environment based both on actions taken by a scored user profile and actions taken by other user profiles in response to the scored user profile. The computation of categories provides more insight into how a user profile has accumulated a reputation score, which exposes unbalanced interaction behavior to provide a disincentive for manipulation of the reputation system. The use of reputation levels contextualizes a user profile's reputation score within the community of default network user profiles, which makes a reputation score more intuitively valuable. Rankings of user profiles by reputation may be used to seek out leaders in the default network computing system. Coupled with other attributes of the default network computing system, the reputation system improves the quality and verifiability of information disseminated on the default network computing system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for quantifying user reputation in a default network based on user attributes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for computing an overall reputation score for a user profile of a default network computing system, the method comprising:
   receiving a request from a client device to provide an interface including a reference to the user profile of the default network computing system;

retrieving, from the default network computing system, a plurality of user action counts, each user action count indicating how many times a particular action relating to the referenced user profile has occurred within the default network computing system;

multiplying, through the default network computing system, each of the plurality of user action counts by one of a plurality of weighting factors to determine a plurality of products, each weighting factor corresponding to a particular user action count;

summing, through the default network computing system, each product in the determined plurality of products to calculate an action count reputation score for the referenced user profile;

identifying a default network comprising user profiles having at least one profile attribute in common with the referenced user profile, each profile attribute provided by a corresponding user for inclusion in a corresponding user profile;

retrieving a connection reputation score determined from an aggregation of connected profile reputation scores determined for other user profiles in the identified default network and connected to the referenced user profile, a connected profile reputation score determined based at least in part on actions performed by a connected user profile with respect to a third user profile not connected to the referenced user profile;

determining, through the default network computing system, the overall reputation score for the referenced user profile by adding the retrieved connection reputation score multiplied by a connection reputations weight to the referenced user profile's action count reputation score;

storing, in the default network computing system, the overall user reputation score for the referenced user profile; and providing the requested interface for display by the client device, the interface comprising the overall user reputation score for the referenced user profile.

2. The computer-implemented method of claim 1, wherein the method is repeated for determining a plurality of overall user reputation scores for a plurality of user profiles of the default network computing system.

3. The computer-implemented method of claim 2, wherein providing the requested interface comprises:
determining a ranking of the referenced user profile among the plurality of user profiles according to the plurality of overall user reputation scores; and
providing, for display by the client device in the requested interface, the determined ranking of the referenced user profile.

4. The computer-implemented method of claim 3, wherein providing the requested interface comprises:
determining a percentile ranking for the referenced user profile among the plurality of user profiles based on the determined ranking and a total number of the plurality of user profiles;
determining a reputation level for the referenced user profile based on whether the determined percentile ranking is within a range of percentile rankings; and
providing, for display by the client device in the requested interface, the determined reputation level.

5. The computer-implemented method of claim 1, wherein particular actions that are counted by the user action counts include one or more of: a content item view, a content item upload, a content item interaction, a view by another user profile of a content item uploaded by the referenced user profile, an interactions by another user profile with the referenced user profile, an interaction by another user profile with a content item uploaded by the referenced user profile, a membership in a group, a connection with another user profile, and any combination thereof.

6. The computer-implemented method of claim 1,
wherein the identified default network comprises user profiles having a same account type and a same industry practice area as the referenced user profile; and
wherein providing the requested user interface comprises:
determining a default network ranking of the referenced user profile's overall reputation score among overall reputation scores of other user profiles in the same default network as the referenced user profile; and
providing the default network ranking to the client device for display in the requested interface.

7. The computer-implemented method of claim 1, wherein the action counts comprise an action count corresponding to a number of critical mass posts by the referenced user within the default network computing system, each critical mass post having received more than a threshold number of interactions from other user profiles of the default network computing system.

8. A computer-implemented method for computing an overall reputation score for a user profile of a default network computing system, the method comprising:
receiving a request from a client device to provide an interface including a reference to the user profile of the default network computing system;
retrieving a plurality of user action counts, each user action count indicating how many times a particular action relating to the referenced user profile has occurred within the default network computing system;
multiplying each of the plurality of user action counts by one of a plurality of weighting factors to determine a plurality of products;
summing each product in the determined plurality of products to calculate an action count reputation score for the referenced user profile;
identifying a default network comprising user profiles having at least one profile attribute in common with the referenced user profile, each profile attribute provided by a corresponding user for inclusion in a corresponding user profile;
retrieving a connection reputation score determined from an aggregation of connected profile reputation scores determined for other user profiles in the identified default network and connected to the referenced user profile, a connected profile reputation score determined based at least in part on actions performed by a connected user profile with respect to a third user profile not connected to the referenced user profile;
determining, by the default network computing system, the overall reputation score for the referenced user profile by adding the retrieved connection reputation score multiplied by a connection reputations weight to the referenced user profile's action count reputation score;
storing the overall user reputation score for the referenced user profile; and
providing the requested interface for display by the client device, the interface comprising the overall user reputation score for the referenced user profile.

9. The computer-implemented method of claim 8, wherein the method is repeated for determining a plurality of overall user reputation scores for a plurality of user profiles of the default network computing system.

10. The computer-implemented method of claim 9, wherein providing the requested interface comprises:
- determining a ranking of the referenced user profile among the plurality of user profiles according to the plurality of overall user reputation scores; and
- providing the determined ranking for the referenced user in the requested interface.

11. The computer-implemented method of claim 8, wherein providing the requested interface comprises:
- determining a reputation level for the referenced user profile based on the overall reputation score exceeding a threshold score; and
- providing the determined reputation level for the referenced user profile in the requested interface.

12. The computer-implemented method of claim 8, wherein particular actions that are counted by the user action counts include one or more of: a content item view, a content item upload, a content item interaction, a membership in a group, a connection with another user profile, and any combination thereof.

13. The computer-implemented method of claim 8,
- wherein the identified default network comprises user profiles having a same account type and a same industry practice area as the referenced user profile; and
- wherein providing the requested user interface comprises:
  - determining a default network ranking of the referenced user profile's overall reputation score among overall reputation scores of other user profiles in the same default network as the referenced user profile; and
  - providing the default network ranking to the client device for display in the requested interface.

14. The computer-implemented method of claim 8, wherein the action counts comprise an action count corresponding to a number of critical mass posts by the referenced user within the default network computing system, each critical mass post having received more than a threshold number of interactions from other user profiles of the default network computing system.

15. A non-transitory computer-readable medium configured to store instructions, the instructions when executed by a processor cause the processor to:
- receive a request from a client device to provide an interface including a reference to a user profile of a default network computing system;
- retrieve a plurality of user action counts, each user action count indicating how many times a particular action relating to the referenced user profile has occurred within the default network computing system;
- multiply each of the plurality of user action counts by one of a plurality of weighting factors to determine a plurality of products;
- sum each product in the determined plurality of products to calculate an action count reputation score for the referenced user profile;
- identify a default network comprising user profiles having at least one profile attribute in common with the referenced user profile, each profile attribute provided by a corresponding user for inclusion in a corresponding user profile;
- retrieve a connection reputation score determined from an aggregation of connected profile reputation scores determined for other user profiles in the identified default network and connected in the default network computing to the referenced user profile, a connected profile reputation score determined based at least in part on actions performed by a connected user profile with respect to a third user profile not connected to the referenced user profile;
- determine the overall reputation score for the referenced user profile by adding the retrieved connection reputation score multiplied by a connection reputations weight to the referenced user profile's action count reputation score;
- store the overall user reputation score for the referenced user profile; and
- provide the requested interface for display by the client device, the interface comprising the overall user reputation score for the referenced user profile.

16. The computer-readable medium of claim 15, wherein the instructions further comprise instructions for determining a plurality of user reputation scores for a plurality of user profiles of the default network computing system.

17. The computer-readable medium of claim 16, wherein instructions to cause the processor to provide the requested interface comprise instructions that cause the processor to:
- determine a ranking of the referenced user profile among the plurality of user profiles according to the plurality of overall user reputation scores; and
- provide the determined ranking for the referenced user in the requested interface.

18. The computer-readable medium of claim 17, wherein instructions to cause the processor to provide the requested interface comprise instructions that cause the processor to:
- determine a percentile ranking for the referenced user profile among the plurality of user profiles based on the determined ranking and a total number of the plurality of user profiles;
- determine a reputation level for the referenced user profile based on whether the determined percentile ranking is within a range of percentile rankings.

19. The computer-readable medium of claim 15, wherein particular actions that are counted by the user action counts include one or more of: a content item view, a content item upload, a content item interaction, a view by another user profile of a content item uploaded by the referenced user profile, an interaction by another user profile with the referenced user profile, an interaction by another user profile with a content item uploaded by the referenced user profile, a membership in a group, a connection with another user profile, and any combination thereof.

20. The computer-readable medium of claim 15,
- wherein the identified default network comprises user profiles having a same account type and a same industry practice area as the referenced user profile; and
- wherein instructions to provide the requested interface comprise instructions that cause the processor to:
  - determine a default network ranking of the referenced user profile's overall reputation score among reputation scores of other user profiles in the same default network as the referenced user profile; and
  - provide the default network ranking to the client device for display in the requested interface.

* * * * *